United States Patent
Dennison

(10) Patent No.: US 11,236,680 B2
(45) Date of Patent: Feb. 1, 2022

(54) GAS TURBINE ENGINE WITH A MICROWAVE GENERATOR

(71) Applicant: ROLLS-ROYCE plc, London (GB)

(72) Inventor: Stephen G. Dennison, Derby (GB)

(73) Assignee: ROLLS-ROYCE plc, London (GB)

( * ) Notice: Subject to any disclaimer, the term of this patent is extended or adjusted under 35 U.S.C. 154(b) by 158 days.

(21) Appl. No.: 16/740,724

(22) Filed: Jan. 13, 2020

(65) Prior Publication Data

US 2020/0248633 A1   Aug. 6, 2020

(30) Foreign Application Priority Data

Jan. 31, 2019   (GB) .................................... 1901320

(51) Int. Cl.
*F02C 9/00* (2006.01)

(52) U.S. Cl.
CPC .......... *F02C 9/00* (2013.01); *F05D 2270/804* (2013.01); *F05D 2270/805* (2013.01)

(58) Field of Classification Search
CPC ...... F02C 3/28; F02C 7/00; F02C 9/00; F05D 2270/804; F05D 2270/805; F05D 2260/83; F05D 2260/80; F23R 3/28
See application file for complete search history.

(56) References Cited

U.S. PATENT DOCUMENTS

| | | | |
|---|---|---|---|
| 7,204,133 B2 * | 4/2007 | Benson | F23N 5/123 73/112.01 |
| 8,863,495 B2 * | 10/2014 | Ikeda | F02C 7/264 60/39.821 |
| 2008/0289342 A1 | 11/2008 | Sappey et al. | |
| 2010/0071375 A1 | 3/2010 | Myhre | |
| 2010/0280732 A1 | 11/2010 | Singh et al. | |
| 2010/0313572 A1 | 12/2010 | McManus et al. | |
| 2011/0225948 A1 * | 9/2011 | Valeev | F23C 99/001 60/39.821 |
| 2015/0017591 A1 * | 1/2015 | Mitchell | F23N 5/242 431/75 |

(Continued)

FOREIGN PATENT DOCUMENTS

| | | |
|---|---|---|
| EP | 2180166 | 4/2010 |
| WO | 2014011263 | 1/2014 |

OTHER PUBLICATIONS

Great Britain search report dated Jul. 31, 2019, issued in GB Patent Application No. GB1901320.0.

(Continued)

*Primary Examiner* — Jason H Duger
(74) *Attorney, Agent, or Firm* — Crowell & Moring LLP

(57) ABSTRACT

A combustor for a gas turbine engine comprising: a combustion chamber; at least one fuel spray nozzle operable to deliver a fuel-air mixture into the combustion chamber, wherein during operation of the gas turbine engine the fuel-air mixture is combusted in the combustion chamber, thereby producing a combustion flame; a microwave generator coupled to a waveguide arranged to guide microwaves from the microwave generator into the combustion chamber such that the microwaves are incident on at least a portion of the combustion flame; and a detector operable to detect at least a portion of the microwaves reflected by the combustion flame and/or atomised fuel droplets.

14 Claims, 4 Drawing Sheets

(56) References Cited

U.S. PATENT DOCUMENTS

2015/0047363 A1 2/2015 Steinwandel et al.
2016/0007437 A1 1/2016 Ikeda

OTHER PUBLICATIONS

European search report dated Jun. 22, 2020, issued in EP Patent Application No. EP20150775.
Andreas, et., al, "Setup for Microwave Stimulation of a turbulent low-swirl flame," Journal of Physics D: Applied Physics, Institute of Physics Publishing LTD, vol. 49, No. 18, Apr. 8, 2016, p. 0022-3727.
European Search Opinion with Communication Transmittal for Patent Application No. EP20150775.3 dated Jul. 3, 2020, 4 pages.

* cited by examiner

GAS TURBINE ENGINE WITH A MICROWAVE GENERATOR

CROSS-REFERENCE TO RELATED APPLICATIONS

This specification is based upon and claims the benefit of priority from United Kingdom patent application number GB 1901320.0 filed on Jan. 31, 2019, the entire contents of which are incorporated herein by reference.

BACKGROUND

Technical Field

The present disclosure relates to gas turbine engines and more particularly to apparatus and methods for controlling operation of gas turbine engines, e.g. in order to reduce emissions from gas turbine engines.

Description of the Related Art

Reducing emissions from aircraft gas turbine engines is desirable, in order to lessen environmental impact of aircraft operations. Further, ever-tightening environmental legislation in many areas of the world means that reducing emissions from aircraft gas turbine engines may be imperative, and not merely desirable, for aircraft operators, e.g. airlines, to be able to continue operating in such areas in future.

An aircraft gas turbine engine comprises combustion equipment in which air is mixed with fuel to provide a fuel-air mixture, which is then combusted. In theory, emissions will be lowest when the mixture has a fuel-to-air ratio with the optimum stoichiometric mix.

Generally, a gas turbine engine which operates using a fuel-rich mixture may be termed a rich-burn engine and a gas turbine engine which operates using an air-rich mixture may be termed a lean-burn engine. The rich-burn engine and the lean-burn engine may operate with fuel-air mixtures either side of the optimum stoichiometric mixture.

There is currently no satisfactory apparatus or method of measuring the fuel burn and/or monitoring the combustion flame to enable control of the fuel-air mixture, e.g. in order to reduce emissions.

During aircraft gas turbine engine testing on an engine test bed, large optical systems may be employed to monitor the combustion flame. Such large optical systems are cumbersome and costly to set up. It is not feasible to employ such large optical systems during in-flight aircraft gas turbine engine testing or during an aircraft gas turbine engine's service lifetime.

Another problem is that aircraft gas turbine engines operate at high temperatures hindering or making uneconomical any possible in-service deployment of an optical system within the combustion equipment.

SUMMARY

A first aspect provides a combustor for a gas turbine engine, the combustor comprising:
a combustion chamber;
at least one fuel spray nozzle operable to deliver a fuel-air mixture into the combustion chamber, wherein during operation of the gas turbine engine the fuel-air mixture is combusted in the combustion chamber, thereby producing a combustion flame;
a microwave generator coupled to a waveguide arranged to guide microwaves from the microwave generator into the combustion chamber such that the microwaves are incident on at least a portion of the combustion flame; and
a detector operable to detect at least a portion of the microwaves reflected by the combustion flame and/or atomised fuel droplets.

The combustor may comprise a plurality of fuel spray nozzles.

A fuel supply line may be in fluid communication with the or each fuel spray nozzle. The fuel supply line(s) may be operable to introduce desired quantities of fuel into a stream of air flowing within the fuel spray nozzle, to produce a fuel-air mixture.

A swirler may be disposed within one or more, e.g. all, of the fuel spray nozzles. The swirler may promote good mixing of the fuel and air in the fuel-air mixture. The swirler may extend longitudinally within the fuel spray nozzle. The swirler may be disposed centrally within the fuel spray nozzle. The swirler may extend a distance along a central longitudinal axis of the fuel spray nozzle.

The microwave generator may be operable to generate microwaves having any frequency in the microwave part of the electromagnetic spectrum (i.e. between 300 MHz and 300 GHz). For instance, the microwaves may have a frequency of 24 GHz.

The waveguide may extend at least partially along the fuel spray nozzle or one of the fuel spray nozzles. The waveguide may extend longitudinally through the fuel spray nozzle or one of the fuel spray nozzles.

The waveguide may extend into the combustion chamber in a direction at an angle to the fuel spray nozzle and/or at a location removed from the fuel spray nozzle.

The waveguide may comprise a tubular member having any suitable inner diameter. The waveguide may have an inner diameter of at least 2 mm, up to or at least 5 mm, up to or at least 10 mm, up to or at least 15 mm, and/or up to or at least 20 mm. The waveguide may have an inner diameter of approximately 9 mm.

The waveguide may be made from a high temperature alloy or superalloy such as a nickel-chromium-based superalloy. The nickel-chromium-based superalloy may be selected from the Inconel™ family of nickel-chromium-based superalloys.

The or a swirler disposed within the fuel spray nozzle may have a bore extending therethrough. The bore may be a longitudinally-extending bore. The bore may be a central bore. The bore may provide the waveguide or at least a portion of the waveguide.

The detector may comprise at least one antenna located at a position for receiving microwaves reflected by the combustion flame.

The antenna may be disposed at an end of the waveguide proximal the combustion chamber.

The antenna may be operable to receive microwaves reflected by the combustion flame and/or atomised fuel droplets and to generate an electrical signal. The electrical signal may be transmitted away from the combustion chamber to a processing means. The electrical signal may be transmitted along at least a portion of the waveguide in a direction away from the combustion chamber. The processing means may be located remotely from the combustion chamber. Transmission of the electrical signal to the processing means may be accomplished by any suitable means, e.g. by wire and/or wirelessly.

The microwaves reflected by the combustion flame and/or atomised fuel droplets that are detected by the detector may produce an image signal characteristic of the combustion flame at a given time. A series of image signals may be produced, in order to enable monitoring of the combustion flame at a plurality of points in time. The series of image signals may be produced at regular or irregular intervals.

The processing means may be arranged to compare the or each image signal with at least one reference image signal. The reference image signal may for example represent an optimum or near-optimum combustion flame for given engine operating conditions.

The processing means may be arranged to generate one or more control signals to vary directly or indirectly the operation of the gas turbine engine, in order to change the combustion flame. One of the control signals may modulate the rate of fuel supplied to the fuel spray nozzle(s) via one or more of the fuel supply lines, in order to modify the fuel-air mixture in a desired way. Additionally or alternatively, one of the control signals may modulate the air flow within one or more of the fuel spray nozzles, in order to modify the fuel-air mixture in a desired way.

A second aspect provides a system for monitoring and/or controlling the operation of a gas turbine engine, the system comprising:
 a combustor according to the first aspect; and
 a processing means operably connected to the detector;
 wherein the processing means is arranged to compare an image signal with at least one reference image signal.

The reference image signal may for example represent an optimum or near-optimum combustion flame for given engine operating conditions.

The processing means may be arranged to generate one or more control signals to vary directly or indirectly the operation of the gas turbine engine, in order to change the combustion flame. One of the control signals may modulate the rate of fuel supplied to the fuel spray nozzle(s) via one or more of the fuel supply lines, in order to modify the fuel-air mixture in a desired way. Additionally or alternatively, one of the control signals may modulate the air flow within one or more of the fuel spray nozzles, in order to modify the fuel-air mixture in a desired way.

The processing means may be located remotely from the combustor.

A third aspect provides a gas turbine engine comprising a combustor according to the first aspect or a system according to the second aspect.

The gas turbine engine may be an aircraft gas turbine engine.

A gas turbine engine for an aircraft may comprise: an engine core comprising a turbine, a compressor, and a core shaft connecting the turbine to the compressor; a fan located upstream of the engine core, the fan comprising a plurality of fan blades; and, optionally, a gearbox that receives an input from the core shaft and outputs drive to the fan so as to drive the fan at a lower rotational speed than the core shaft, wherein the engine core comprises a combustor according to the first aspect.

The turbine may be a first turbine. The compressor may be a first compressor. The core shaft may be a first core shaft.

The engine core may further comprise a second turbine, a second compressor, and a second core shaft connecting the second turbine to the second compressor. The second turbine, second compressor, and second core shaft may be arranged to rotate at a higher rotational speed than the first core shaft.

The gas turbine engine of the third aspect may form part of a structure. The structure may be an industrial or commercial building or facility. The structure may be a vehicle such as an aircraft, a spacecraft, a ship, an amphibious vehicle or a land-based, e.g. road-going vehicle.

A fourth aspect provides a method of monitoring a combustion flame in a combustor of a gas turbine engine, the method comprising the steps of:
 illuminating at least a portion of the combustion flame with microwaves;
 detecting at least a portion of the microwaves reflected by the combustion flame and/or atomised fuel droplets; and
 analysing the detected microwaves reflected by the combustion flame and/or atomised fuel droplets.

Analysing the microwaves reflected by the combustion flame and/or atomised fuel droplets may include comparing a signal provided by, or derived from, the detected reflected microwaves with a reference signal.

Depending upon the results of the analysis of the detected microwaves reflected by the combustion flame and/or atomised fuel droplets, the method may further comprise a step of varying the operation of the gas turbine engine in order to change the combustion flame.

A fifth aspect provides a method of operating a gas turbine engine, the method comprising the steps of:
 monitoring the combustion flame in the combustor of the gas turbine engine according to the method of the fifth aspect; and
 depending upon the results of the analysis of the detected microwaves reflected by the combustion flame and/or atomised fuel droplets, varying the operation of the gas turbine engine in order to change the combustion flame.

The methods of the fifth and/or sixth aspect may be performed using an apparatus disclosed herein, e.g. a combustor according to the first aspect or a system according to the second aspect.

The methods of the fourth and/or fifth aspect may be carried out in-service and/or during testing of the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105

Nkg⁻¹s, 100 Nkg⁻¹s, 95 Nkg⁻¹s, 90 Nkg⁻¹s, 85 Nkg⁻¹s or 80 Nkg⁻¹s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
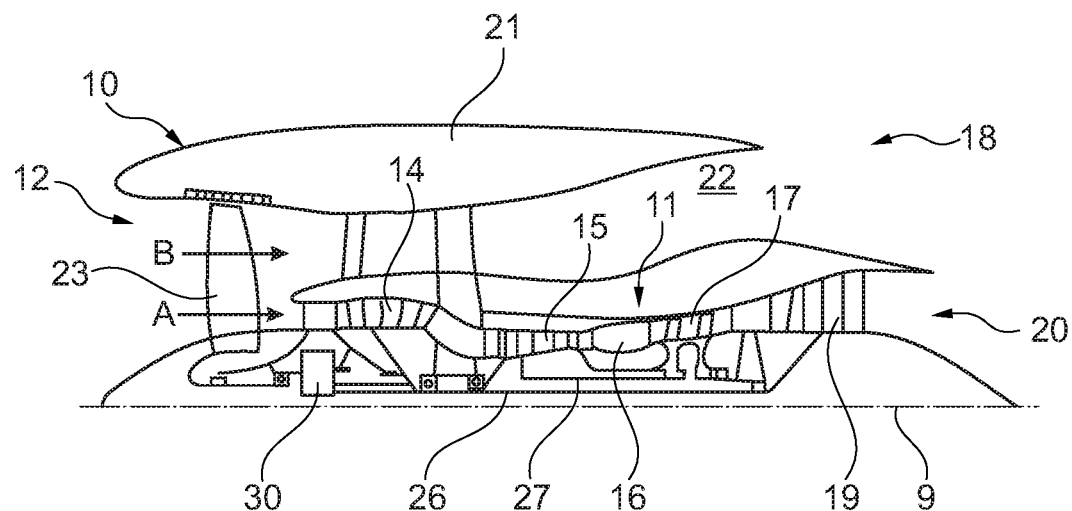
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
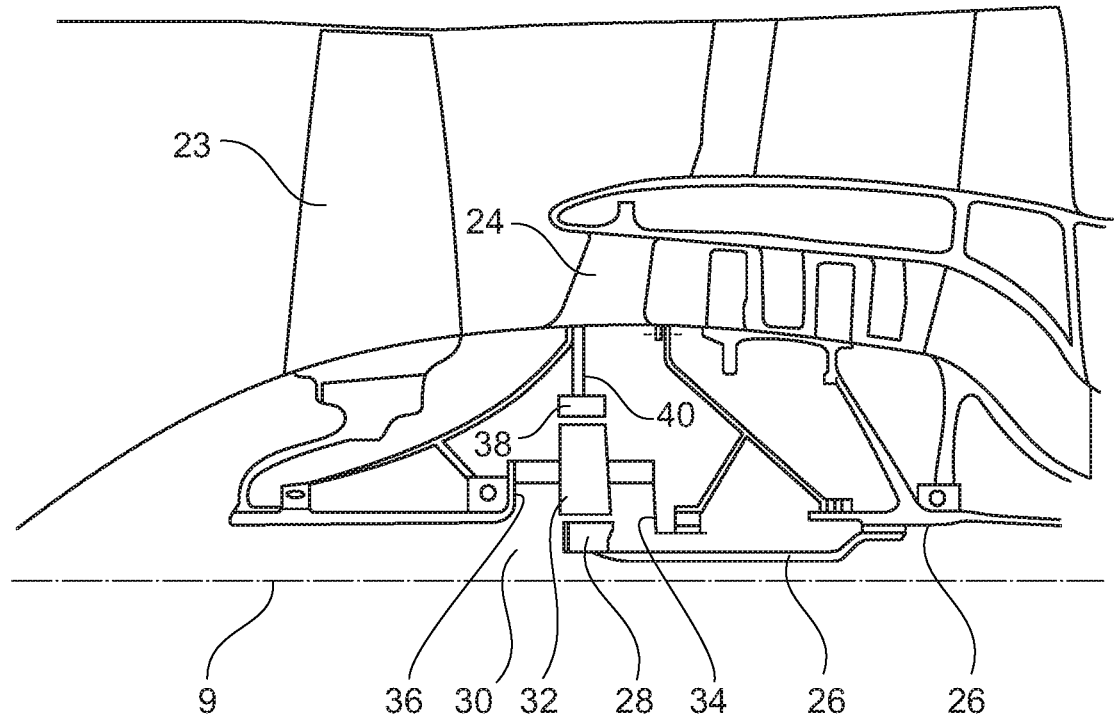
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
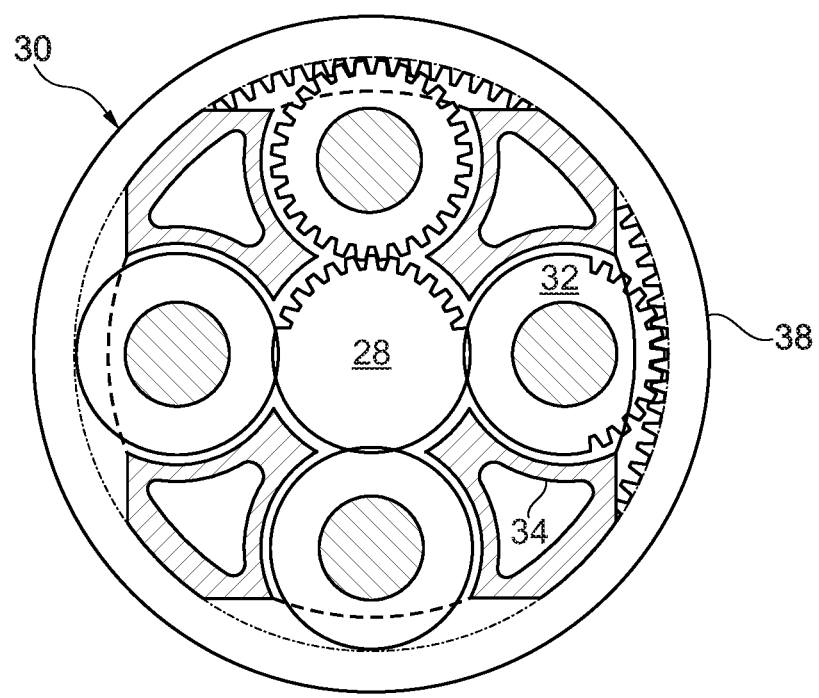
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
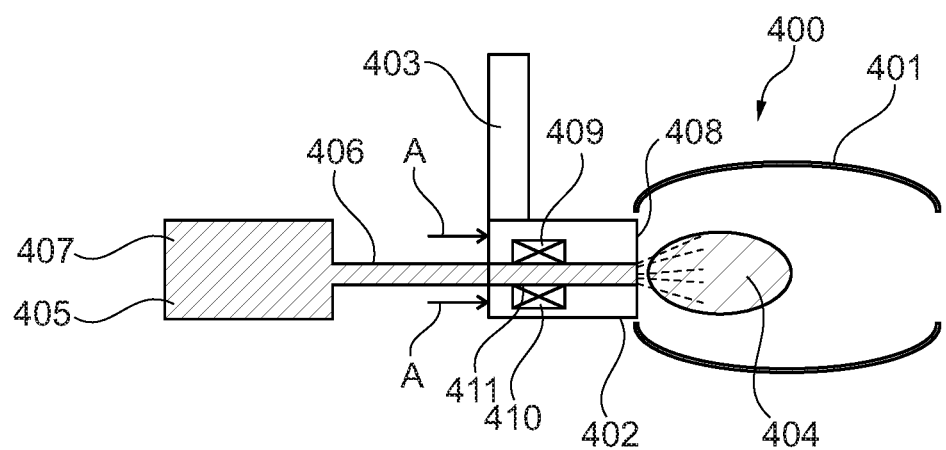
FIG. 4 is an example of a combustor for a gas turbine engine.

FIG. 4 shows a combustor 400 for a gas turbine engine. The combustor 400 may be configured to form part of the combustion equipment of any gas turbine engine, e.g. an aircraft gas turbine engine. For example, the combustor 400 may be configured to form part of the combustion equipment 16 of the gas turbine engine 10 described herein.

The combustor 400 comprises a combustion chamber 401. One or more, typically a plurality of, fuel spray nozzles introduce a fuel-air mixture into the combustion chamber 401. For clarity, only one fuel spray nozzle 402 is shown in FIG. 4. However, it will be understood that the one illustrated fuel spray nozzle 402 may be one of many fuel spray nozzles. Air enters the fuel spray nozzle 402 as indicated by arrows A and flows along the fuel spray nozzle 402. Desired quantities of fuel are introduced into the air flowing along the fuel spray nozzle 402 from a fuel supply line 403, thereby producing the fuel-air mixture. For clarity, only one fuel supply line 403 is shown in FIG. 4. However, it will be understood that the one illustrated fuel supply line 403 may be one of many fuel supply lines that communicate with the fuel spray nozzle 402. The fuel-air mixture then flows into the combustion chamber 401 where it is ignited. A combustion flame 404 is produced within the combustion chamber 401. A swirler 409 extends longitudinally within the fuel spray nozzle 402 to promote good mixing of the fuel and air in the fuel-air mixture. The swirler 409 is disposed centrally within the fuel spray nozzle 402. The swirler 409 extends a distance along a central longitudinal axis of the fuel spray nozzle 402. The swirler 409 has a plurality of swirl vanes 410 on an outer surface thereof.

The combustion chamber 401 may be an annular combustion chamber having a plurality of circumferentially-spaced fuel spray nozzles. Alternatively, the combustion chamber 401 may be a tubular combustion chamber having a single fuel spray nozzle. There may be a plurality of tubular combustions chambers, each one of which has a single fuel spray nozzle. The tubular combustion chambers may be circumferentially spaced apart.

A fuel spray nozzle 402 with a single fuel supply line 403 is typically a rich burn fuel spray nozzle. A fuel spray nozzle 402 with two fuel supply lines 403 is typically a lean burn fuel spray nozzle, which comprises a pilot fuel supply line and a main fuel supply line.

A microwave apparatus 407 comprises a microwave generator 405 and a waveguide 406 coupled to the microwave generator 405. The microwave generator 405 may be operable to generate microwaves having any frequency in the microwave part of the electromagnetic spectrum (i.e. between 300 MHz and 300 GHz). For instance, the microwaves may have a frequency of 24 GHz.

The waveguide 406 is arranged to guide microwaves generated by the microwave generator 405 into the combustion chamber 401. The waveguide 406 extends longitudinally through the fuel spray nozzle 402.

The waveguide 406 may comprise a tubular member having any suitable inner diameter and/or made from any suitable material for withstanding elevated temperatures. For instance, the waveguide 406 may have an inner diameter of approximately 9 mm. The waveguide 406 may be made from a high temperature alloy or superalloy such as a nickel-chromium-based superalloy. The nickel-chromium-based superalloy may be selected from the Inconel™ family of nickel-chromium-based superalloys.

The swirler 409 extending longitudinally within the fuel spray nozzle 402 has a longitudinally-extending bore 411 therethrough, e.g. a central bore. The waveguide 406 passes through the bore 411. In some embodiments, the longitudinally-extending bore may provide at least part of the waveguide 406.

The microwave apparatus 407 further comprises an antenna 408, which is disposed at an end of the waveguide 406 proximal to the combustion chamber 401. The antenna 408 is operable to receive microwaves reflected by the combustion flame 404 and/or atomised fuel droplets and to generate an electrical signal, which is transmitted along the waveguide 406 in a direction away from the combustion chamber 401 and then via any suitable means (e.g. by wire and/or wirelessly) to a processing means (not shown). The processing means may be located proximal to the microwave apparatus 407 or may be located remotely from the microwave apparatus 407. For instance, the microwave apparatus 407 and the processing means may share a common housing.

The antenna may be located at any position for receiving microwaves reflected by the combustion flame and/or atomised fuel droplets. More than one antenna may be employed, e.g. to receive microwaves reflected by the combustion flame and/or atomised fuel droplets in more than one direction.

Figure 5:
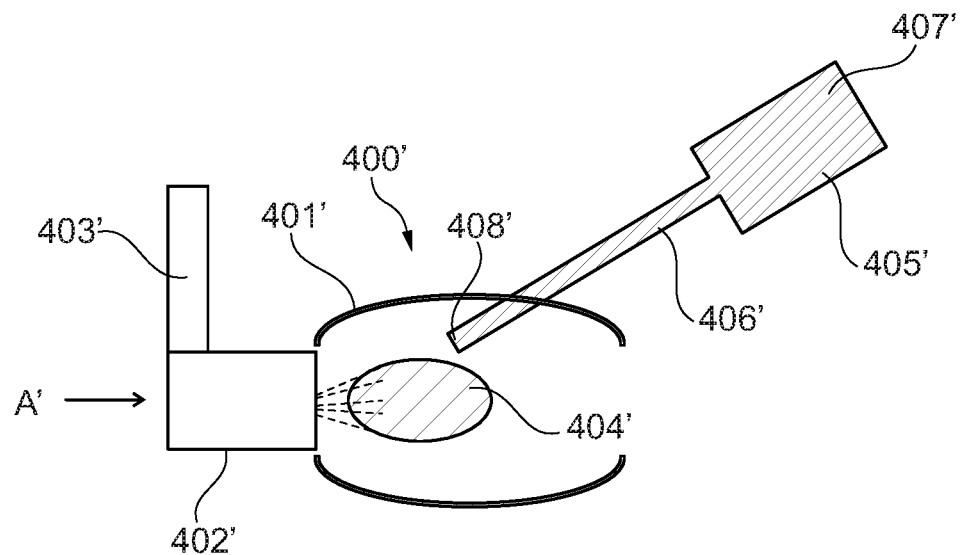
FIG. 5 is another example of a combustor for a gas turbine engine.

FIG. 5 shows a combustor 400' for a gas turbine engine. The combustor 400' may be configured to form part of the combustion equipment of any gas turbine engine, e.g. an aircraft gas turbine engine. For example, the combustor 400' may be configured to form part of the combustion equipment 16 of the gas turbine engine 10 described herein.

The combustor 400' comprises a combustion chamber 401'. One or more, typically a plurality of, fuel spray nozzles introduce a fuel-air mixture into the combustion chamber 401'. For clarity, only one fuel spray nozzle 402' is shown in FIG. 5. However, it will be understood that the one illustrated fuel spray nozzle 402' may be one of many fuel spray nozzles. Air enters the fuel spray nozzle 402' as indicated by arrow A' and flows along the fuel spray nozzle 402'. Desired quantities of fuel are introduced into the air flowing along the fuel spray nozzle 402' from a fuel supply line 403', thereby producing the fuel-air mixture. For clarity, only one fuel supply line 403' is shown in FIG. 5. However, it will be understood that the one illustrated fuel supply line 403' may be one of many fuel supply lines that communicate with the fuel spray nozzle 402'. The fuel-air mixture then flows into the combustion chamber 401' where it is ignited. A combustion flame 404' is produced within the combustion chamber 401'. A swirler (not shown) may extend longitudinally within the fuel spray nozzle 402' to promote good mixing of the fuel and air in the fuel-air mixture. The swirler may be disposed centrally within the fuel spray nozzle 402', e.g. the swirler may extend a distance along a central longitudinal axis of the fuel spray nozzle 402'.

The combustion chamber 401 may be an annular combustion chamber having a plurality of circumferentially-spaced fuel spray nozzles. Alternatively, the combustion chamber 401 may be a tubular combustion chamber having a single fuel spray nozzle. There may be a plurality of tubular combustions chambers, each one of which has a single fuel spray nozzle. The tubular combustion chambers may be circumferentially spaced apart.

A fuel spray nozzle 402 with a single fuel supply line 403 is typically a rich burn fuel spray nozzle. A fuel spray nozzle 402 with two fuel supply lines 403 is typically a lean burn fuel spray nozzle, which comprises a pilot fuel supply line and a main fuel supply line.

A microwave apparatus 407' comprises a microwave generator 405' and a waveguide 406' coupled to the microwave generator 405'. The microwave generator 405' may be operable to generate microwaves having any frequency in the microwave part of the electromagnetic spectrum (i.e. between 300 MHz and 300 GHz). For instance, the microwaves may have a frequency of 24 GHz.

The waveguide 406' is arranged to guide microwaves generated by the microwave generator 405' into the combustion chamber 401'. The waveguide 406' extends into the combustion chamber 401' in a direction at an angle to the fuel spray nozzle 402' and at a location removed from the fuel spray nozzle 402'. The microwave apparatus 407' is located downstream of fuel spray nozzle 402'

The waveguide 406' may comprise a tubular member having any suitable inner diameter and/or made from any suitable material for withstanding elevated temperatures. For instance, the waveguide 406' may have an inner diameter of approximately 9 mm. The waveguide 406' may be made from a high temperature alloy or superalloy such as a nickel-chromium-based superalloy. The nickel-chromium-based superalloy may be selected from the Inconel™ family of nickel-chromium-based superalloys.

The swirler extending longitudinally within the fuel spray nozzle 402' may have a longitudinally-extending bore therethrough, e.g. a central bore.

The microwave apparatus 407' further comprises an antenna 408', which is disposed at an end of the waveguide 406' proximal to the combustion chamber 401'. The antenna 408' is operable to receive microwaves reflected by the combustion flame 404' and/or atomised fuel droplets and to generate an electrical signal, which is transmitted along the waveguide 406' in a direction away from the combustion chamber 401' and then via any suitable means (e.g. by wire and/or wirelessly) to a processing means (not shown). The processing means may be located proximal to the microwave apparatus 407' or may be located remotely from the microwave apparatus 407'. For instance, the microwave apparatus 407' and the processing means may share a common housing.

The antenna may be located at any position for receiving microwaves reflected by the combustion flame and/or atomised fuel droplets. More than one antenna may be employed, e.g. to receive microwaves reflected by the combustion flame and/or atomised fuel droplets in more than one direction.

During operation of the combustor 400 or the combustor 400' the microwaves reflected by the combustion flame 404, 404' and/or atomised fuel droplets that are detected by the antenna 408, 408' produce an image signal characteristic of the combustion flame 404, 404' and/or atomised fuel droplets at a given time. A series of image signals may be produced, in order to monitor the combustion flame 404, 404' and/or atomised fuel droplets at a plurality of points in time. The series of image signals may be produced at regular or irregular intervals.

The microwave generator may be configured or configurable to generate discrete pulses, which are then transmitted along the waveguide. In this way, a series of discrete image signals may be produced.

The processing means may be arranged to compare the or each image signal with at least one reference image signal, which may for example represent an optimum or near-optimum combustion flame for given engine operating conditions.

Depending upon the result of the comparison of the image signal(s) with the reference image signal(s), the processing means may be arranged to generate one or more control signals to vary directly or indirectly the operation of the gas turbine engine, in order to change the combustion flame. For instance, one of the control signals may modulate the rate of fuel being supplied to the fuel spray nozzle(s) via one or more of the fuel supply lines, in order to modify the fuel-air mixture in a desired way. Additionally or alternatively, one of the control signals may modulate the air flow within one or more of the fuel spray nozzles, in order to modify the fuel-air mixture in a desired way.

Figure 6:
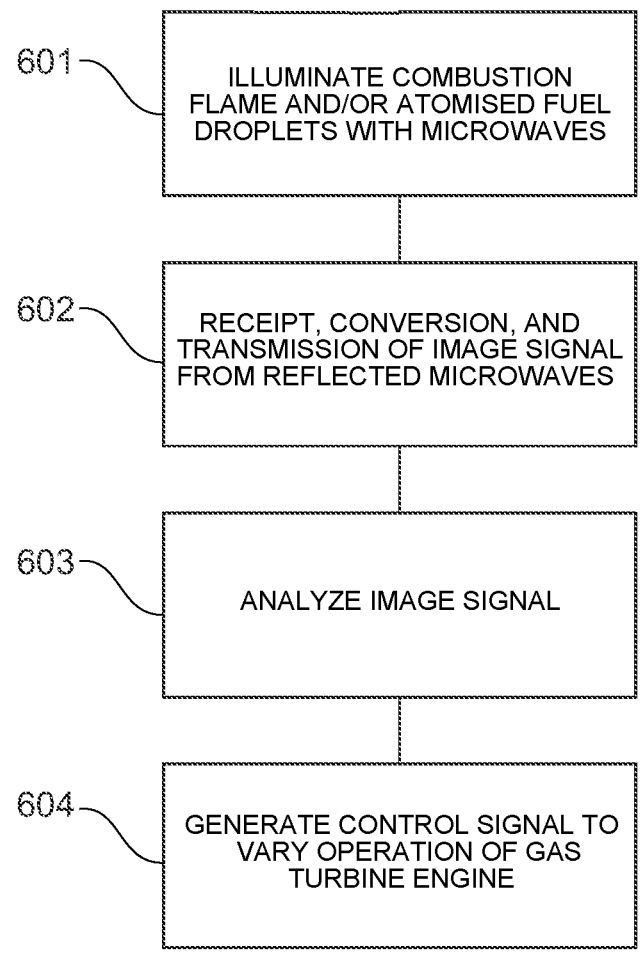
FIG. 6 is a flow chart illustrating a method of monitoring the combustion flame in a gas turbine engine.

A method of monitoring the combustion flame in a gas turbine engine is depicted in FIG. 6. The method may be employed to control the operation of the gas turbine engine in such a way as to reduce or minimise emissions from the gas turbine engine. The method may be carried out using the apparatus described herein, e.g. the apparatus shown in FIG. 4 or FIG. 5 and described above.

In a first step 601, at least a portion of the combustion flame and/or atomised fuel droplets in the combustor of the gas turbine engine is illuminated with microwaves. The microwaves may be conveyed into the combustion chamber via a waveguide.

In a second step 602, at least some of the microwaves reflected by the combustion flame and/or atomised fuel droplets provide an image signal, which is received by an antenna. The antenna converts the reflected microwave signal (the image signal) into an electrical signal, which is transmitted to a processing means. The image signal may constitute a reflected radar signal. The processing means may be located remotely from the combustor, typically in a relatively benign environment.

In a third step 603, the processing means analyses the image signal(s) (received by the processing means in the form of the electrical signal(s)). The image signal may constitute a Doppler burn signature. The processing means may be arranged to compare the or each image signal with at least one reference image signal. The reference image signal may for example represent an optimum or near-optimum combustion flame for given engine operating conditions. The reference image signal may constitute a Doppler burn signature.

In a fourth step 604, if the result of the comparison between the image signal(s) and the reference image signal(s) indicates that the combustion flame does not currently have an optimum or near-optimum appearance, then the processing means generates one or more control signals to vary directly or indirectly the operation of the gas turbine engine, in order to improve the combustion flame. For instance, one of the control signals may modulate the rate of fuel being supplied to the fuel spray nozzle(s) via one or more of the fuel supply lines, in order to modify the fuel-air mixture in a desired way. Additionally or alternatively, one of the control signals may modulate the air flow within one or more of the fuel spray nozzles, in order to modify the fuel-air mixture in a desired way.

The present disclosure may enable more reliable and/or cost-effective engine testing, e.g. on a land-based test rig or in-flight engine testing.

The present disclosure may allow for in-service control of the gas turbine engine to optimise operation of the gas turbine engine during flight. For example, such in-flight control of the operation of the gas turbine engine may be utilised to optimise the operation of the gas turbine engine in a manner that reduces or minimises emissions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A combustor for a gas turbine engine, the combustor comprising:
   a combustion chamber;
   at least one fuel spray nozzle operable to deliver a fuel-air mixture into the combustion chamber, wherein during operation of the gas turbine engine the fuel-air mixture is combusted in the combustion chamber, thereby producing a combustion flame;
   a microwave generator coupled to a waveguide arranged to guide microwaves from the microwave generator into the combustion chamber such that the microwaves are incident on at least a portion of the combustion flame; and,
   a detector operable to detect at least a portion of microwaves reflected by the combustion flame and/or atomised fuel droplets;
   wherein the waveguide extends to the combustion chamber through the fuel spray nozzle or one of the fuel spray nozzles.

2. The combustor of claim 1, wherein the waveguide extends at least partially along the fuel spray nozzle or one of the fuel spray nozzles.

3. The combustor of claim 1, wherein a swirler is disposed within the fuel spray nozzle.

4. The combustor of claim 3, wherein the swirler has a bore extending therethrough and the bore provides the waveguide or at least a portion of the waveguide.

5. The combustor of claim 1, wherein the detector comprises at least one antenna located at a position for receiving at least the portion of the microwaves reflected by the combustion flame and/or atomised fuel droplets.

6. The combustor of claim 5, wherein the antenna is disposed at an end of the waveguide proximal the combustion chamber.

7. The combustor of claim 1, wherein the detector is operably connected to a processing means located remotely from the combustion chamber.

8. The combustor of claim 7, wherein the processing means is arranged to compare an image signal with at least one reference image signal.

9. The combustor of claim 7, wherein the processing means is arranged to generate one or more control signals to vary directly or indirectly the operation of the gas turbine engine, in order to change the combustion flame.

10. A system for monitoring and/or controlling the operation of a gas turbine engine, the system comprising:
    a combustor according to claim 1; and
    a processing means operably connected to the detector;
    wherein the processing means is arranged to compare an image signal with at least one reference image signal.

11. The system of claim 10, wherein the processing means is arranged to generate one or more control signals to vary directly or indirectly the operation of the gas turbine engine, in order to change the combustion flame.

12. A method of monitoring a combustion flame in a combustor of a gas turbine engine, the method comprising the steps of:
    guiding microwaves with a waveguide extending to a combustion chamber through a fuel spray nozzle;
    illuminating at least a portion of the combustion flame with the microwaves;
    detecting at least a portion of microwaves reflected by the combustion flame and/or atomised fuel droplets; and
    analysing the detected microwaves reflected by the combustion flame and/or atomised fuel droplets.

13. The method of claim 12, wherein analysing the detected microwaves reflected by the combustion flame and/or atomised fuel droplets includes comparing a signal provided by, or derived from, the detected reflected microwaves with a reference signal.

14. The method of claim 12, wherein, depending upon the results of the analysis of the detected microwaves reflected by the combustion flame and/or atomised fuel droplets, the method further comprises a step of varying operation of the gas turbine engine in order to change the combustion flame.

* * * * *